United States Patent [19]

Staar

[11] 3,836,241

[45] Sept. 17, 1974

[54] AUDIO-VISUAL DEVICE

[75] Inventor: Marcel Jules Helene Staar, Brussels, Belgium

[73] Assignee: Staar Development Company, Brussels, Belgium

[22] Filed: Apr. 21, 1972

[21] Appl. No.: 246,403

[30] Foreign Application Priority Data

Apr. 23, 1971 Belgium .............................. 766203
Nov. 16, 1971 Belgium .............................. 775363

[52] U.S. Cl. .................................. 353/19, 353/120
[51] Int. Cl. ......................................... G03b 31/06
[58] Field of Search ............................... 353/15–19, 353/120, 9

[56] References Cited

UNITED STATES PATENTS

| | | | |
|---|---|---|---|
| 2,674,920 | 4/1954 | Bennett | 353/9 |
| 3,159,078 | 12/1964 | Schwartz | 353/120 |
| 3,238,842 | 3/1966 | Wiklund | 353/19 |
| 3,434,784 | 3/1969 | Stoyanoff | 353/19 |
| 3,677,630 | 7/1972 | O'Neal | 353/15 |

*Primary Examiner*—Louis R. Prince
*Assistant Examiner*—A. Jason Mirabito
*Attorney, Agent, or Firm*—Wolfe, Hubbard, Leydig, Voit & Osann, Ltd.

[57] ABSTRACT

An audio-visual device for consecutively displaying tranparencies in synchronism with the reproduction of sound recordings corresponding, respectively, to said transparencies, said transparencies being in the form of multiple transparencies carried by a holder and said sound recordings being recorded in multiple recording tracks on an independent, movable recording medium. Also disclosed is a mechanism for shitfing a playback head interconnected with means for moving the transparency holder, so that as the holder is moved to bring each transparency into display position the playback head simultaneously is moved over a recording track to reproduce a recording thereon corresponding to the particular transparency being displayed.

13 Claims, 20 Drawing Figures

AUDIO-VISUAL DEVICE

The present invention relates generally to audio-visual devices.

The principal object of the invention is to provide audio-visual devices which are capable of consecutively displaying multiple transparencies carried by a holder in synchronism with the reproduction of multiple sound recordings corresponding, respectively, to each of the transparencies, and recorded on a recording medium.

Another object of this invention is to provide a practical low cost mechanism for operating the transparency display and sound playback element synchronizing the presentation of the transparencies with playback of the corresponding sound recordings.

This invention is particularly concerned with viewers or projectors for monoscopic or stereoscopic display of multiple transparencies carried by a holder, and provision in such viewers for reproduction of sound recordings corresponding to the transparencies. A further object is the provision in such viewers or projectors with improved mechanism for shifting the transparency holder in synchronism with the operation of a sound recording playback device. A related more detailed object is to provide a drive which is effective for both shifting the transparency holder to move a series of transparencies consecutively to a display position and for shifting elements of the playback mechanism including the playback head relative to multiple playback tracks on an associated recording medium.

Another object is to provide a simple and inexpensive audio-visual device useful as a teaching machine.

Other objects will become apparent from the following description taken in connection with the accompanying drawings, in which:

FIG. 1 is a perspective view in diagrammatic form of an audio-visual device constructed in accordance with the invention;

FIG. **1*a*** is a fragmentary view illustrating a film strip supported in a casing or cartridge and partially projecting through a slot in the end wall of the cartridge such that the display position of a transparency on the film strip is outside the cartridge.

Figures 1, 1A:
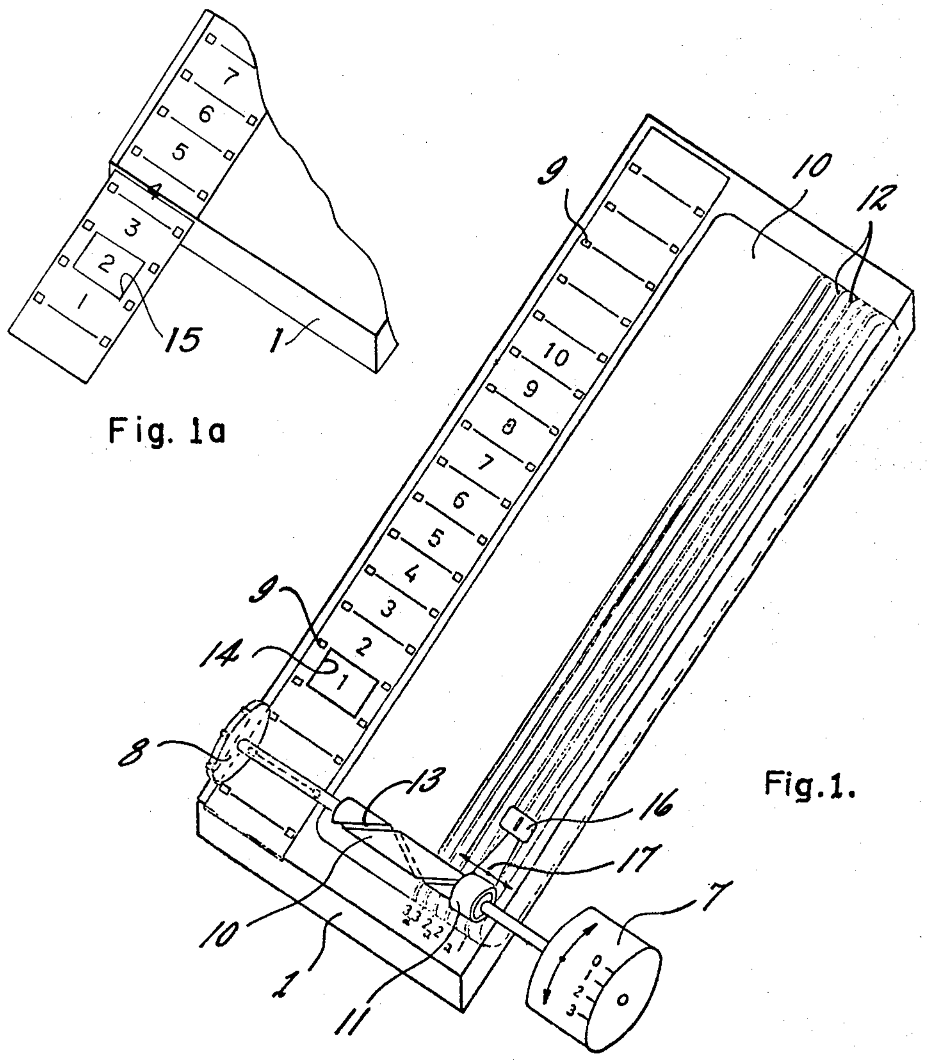

Referring to FIG. 1, an audio-visual device constructed in accordance with the invention is shown diagrammatically as having a casing or cartridge 1 formed internally with an elongated support surface along which a transparency holder 3 is slidable longitudinally. The holder 3 in the present case is illustrated as a film or film strip on which multiple transparencies 1′–10′ are printed in series. The holder 3 is movable by a drive comprising a shaft 6 which is rotatable by an operating knob 7 and which has at one end over the film strip 3 a toothed wheel 8, the teeth projecting through an opening in the top of the casing 1 and cooperating with perforations 9 in the film strip 3.

Also mounted in the casing or cartridge 1 adjacent to the support surface for the transparency holder is a support means for a recording medium herein shown as an endless belt on which recordings are made along parallel recording tracks 12, the endless belt 10 and the transparency holder 3 being mounted in the casing or cartridge of the device such that their longitudinal axes are parallel.

Figures 11, 12, 13, 14:
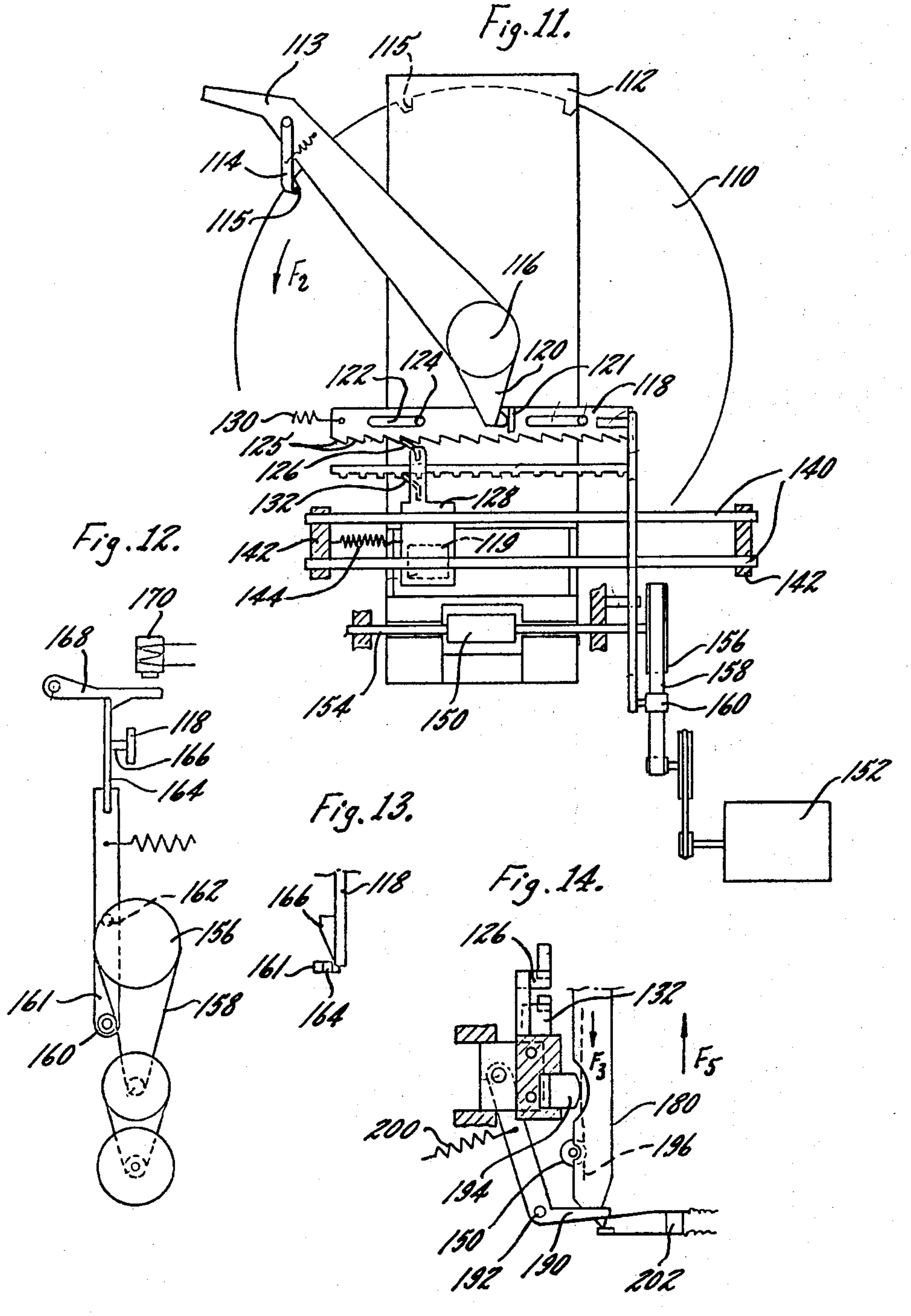
FIG. 11 illustrates in diagrammatic form a drive for consecutively moving transparencies on a circular holder as shown in FIGS. 5 and 9 into a viewing or projection display position, and simultaneously shifting a playback head between recording tracks, and a drive for a belt recording medium.
FIG. 12 is a fragmentary plan view in diagrammatic form of the drive mechanism illustrated in FIG. 11.
FIG. 13 is a detailed view of a portion of the drive mechanism shown in FIG. 12.
FIG. 14 is a fragmentary view in diagrammatic form of further elements added to the mechanism of FIG. 11 to obtain automatic operation of the mechanism responsive to the insertion into the device of a cartridge with a recording medium incorporated therein.

Since support means for an endless belt recording medium are well known in the art they are not detailed in the diagrammatic view of FIG. 1, and, further, drive means for continuously moving the recording belt are well known and are not illustrated but are also included such that the recording medium is continuously driven for playback of sound recorded on the recording tracks while the transparency holder 3 is positioned with a transparency in a display position. A suitable type of drive for the recording belt may be a motor driven capstan 150 as illustrated in FIG. 11.

In the present case, the display position for a transparency carried by the transparency holder 3 is defined by a window 14 in the top surface of the casing and it will be understood that the transparency holder 3 may be shifted to move the transparencies 1'–10' consecutively to the display window by moving the operating knob 7.

For playback of sound recordings on the recording tracks 12 while the transparencies are being displayed, the present invention provides a movably mounted playback head 16 which is shiftable into playing position over each of the recording tracks. In the present case the means for shifting the playback head 16 is interconnected with the drive for moving the transparency holder 3 so that as said holder is moved to bring each transparency into display position under the window 14, in synchronism the playback head 16 simultaneously is moved into playing position over a recording track to reproduce a recording thereon corresponding to the particular transparency being displayed. To drive the playback head a worm 10 is fixed for rotation by the shaft 6, the worm 10 being adapted to move a sleeve 11 which has a projection entering the slot 13 in the worm 10, the sleeve 11 being rigidly secured to an arm 17 bearing the playback head 16.

As shown in FIG. 1, the knob 7 for manually rotating the drive shaft 6 and thus simultaneously shifting the playback head 16 while the transparency holder is moved, is provided with graduations indicating positions of the knob corresponding to the display positions of the transparencies. It will be appreciated that in practice a detent device or the like may be utilized to fix the display positions of the knob more precisely and, in place of a manually operated knob, a power driven actuating means may be used for the shaft 6 such as a motor or solenoid acting by way of a pawl and ratchet wheel to step advance the transparency holder and shift the playback head in synchronism.

In FIG. 1 what is diagrammatically illustrated is a device for display of transparencies on a holder 3 in the form of a film or film strip which may enter and leave the ends of the casing through a slot in the end walls thereof, and provision is made in the top surface of the casing of a display window 14 for display of the transparencies, which would provide a viewer for viewing the transparencies which may be illuminated from below, for example. It is also contemplated that the same general arrangement may be utilized as a projector for displaying the transparencies. In such an arrangement the transparencies would be projected by a lamp (not shown) on a screen or the like and the display position of the transparencies may be within the boundaries at the top surface of the casing or may be located outside the casing aligned with the transparency holder, as illustrated by the reference numeral 15 in FIG. 1*a*.

Figure 2:
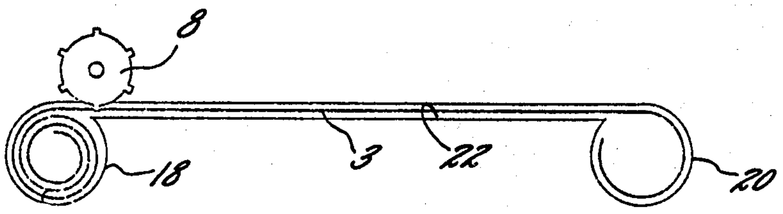
FIG. 2 is a diagrammatic view of the internal construction of a casing for an audio-visual device as shown in FIG. 1 with provision for supporting a transparency holder therein shown as a film strip which is of greater length than the casing.

Instead of having the transparency holder movable lengthwise in the casing and entering and leaving the casing through slots in the end walls thereof, provision may be made internally within the casing 1, as shown in FIG. 2, of cylindrical chambers 18, 20 for storing a transparency holder 3 such as a film or film strip. The toothed wheel 8 is operable to move the transparency holder and carry it from one of the chambers 18, 20 to the other along a movable support surface 22 provided within the casing.

Figures 3, 4:
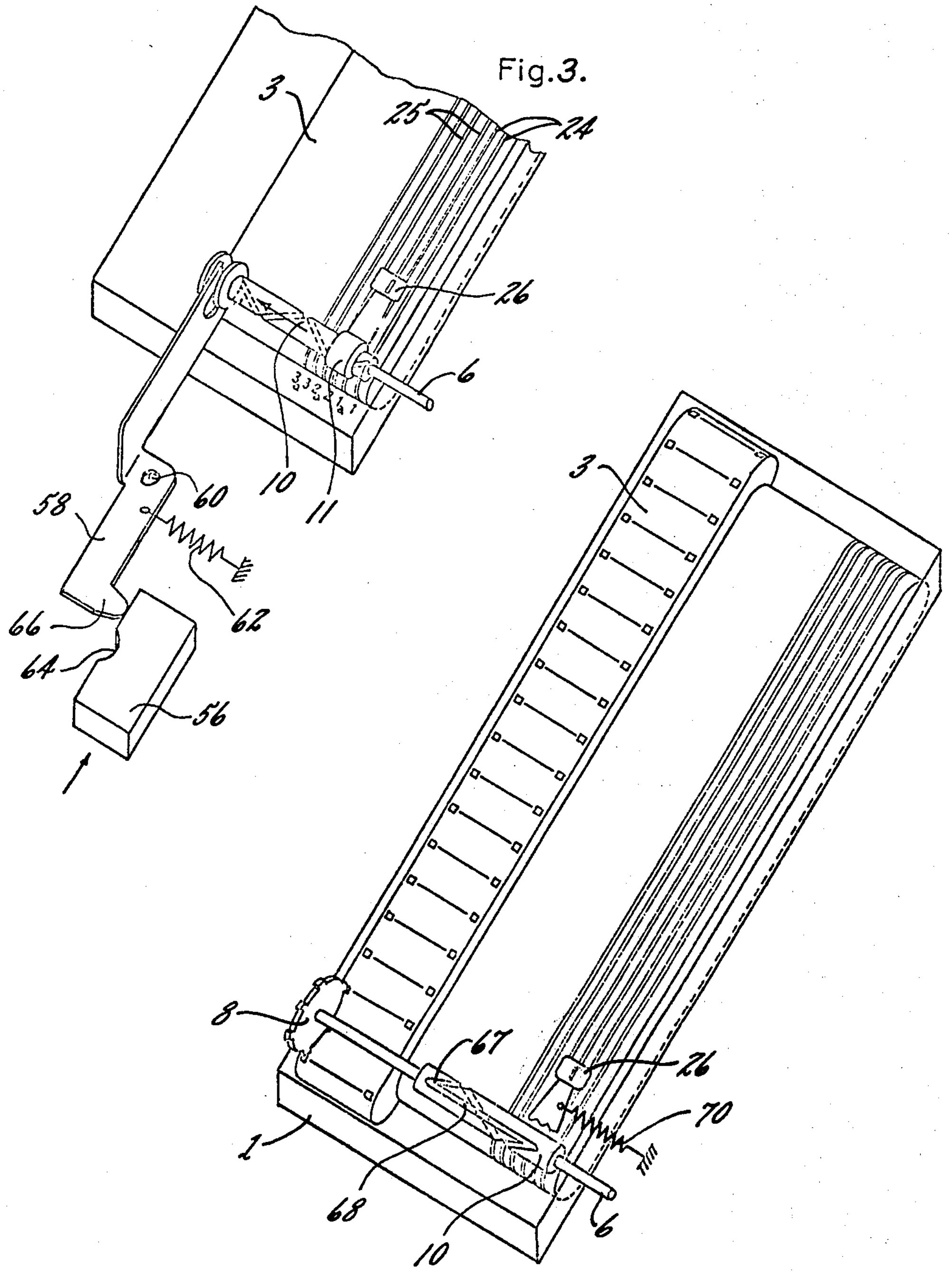
FIG. 3 is a fragmentary perspective view in diagrammatic form of an audio-visual device having a modified arrangement for shifting the playback head of the sound reproducing system.
FIG. 4 is a perspective view in diagrammatic form of an audio-visual device similar to FIG. 1 utilizing a transparency holder in the form of an endless loop of film.
Figure 18:
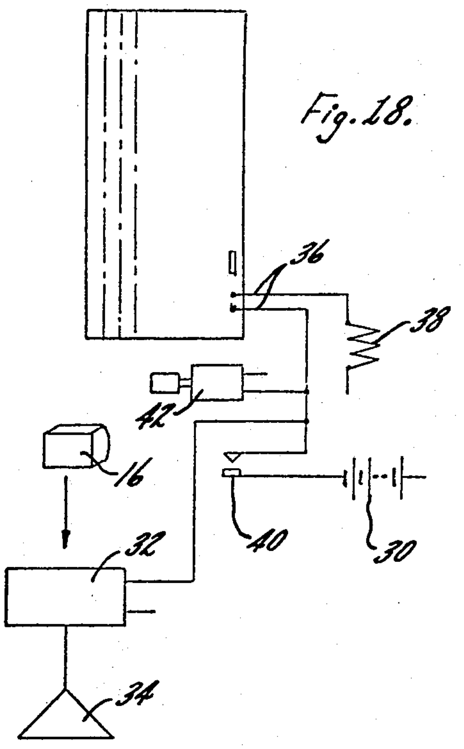
FIG. 18 is a schematic of an electrical circuit for use in controlling an audio-visual device illustrated for example in FIGS. 5 or 9.
Figure 19:
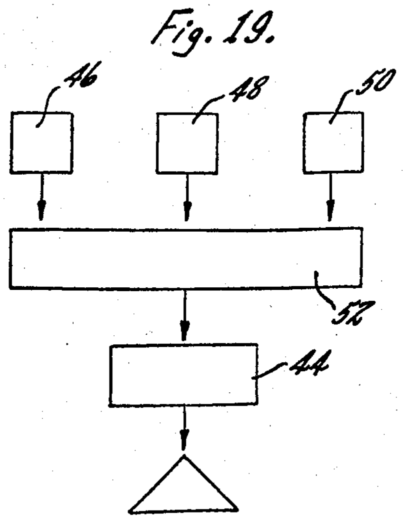
FIG. 19 is a schematic of a system for utilizing an audio-visual device constructed in accordance with this invention in a teaching machine.

One of the features of the invention is the adaptability of audio-visual devices to teaching. As shown in FIG. 3, instead of having as in FIG. 1 adjacent recording tracks corresponding respectively to adjacent transparencies of the transparency holder, and for shifting the playback head from one track to the next track as the transparency holder is shifted to move the next transparency to display position, a pair of tracks may be provided in the recording medium, read by a double playback head, for each transparency. As shown in FIG. 3, pairs of tracks 24, 25 are readable by a double playback head 26, and the worm 10 and sleeve 11 are constructed to shift the head 26 between one of such track pairs 24 and the adjacent track pair 25 in synchronism with the shifting of the transparency holder the distance to move adjacent transparencies to the display position. For teaching purposes, one of the recording tracks of a pair 24 may be readable but non-eraseable while the other track of the pair 24 is provided for recording, erasing, and rerecording as often as desired. Illustratively, the teacher's voice giving, for instance a phrase in a foreign language is prerecorded on the first track of the pair 24, while the second track of the pair is for the use of the pupil, who can imitate the teacher, erase and rerecord and relisten, until, on the basis of comparison with the teacher's voice and accent, the pupil is satisfied with the result. It will be appreciated that the control system for recording, erasing and playback will be arranged so that only the second track of each track pair can be erased and rerecorded. FIGS. 18 and 19 schematically illustrate a circuit and system of this type. FIG. 18 illustrates a power pack 30; the output of a playback head 26 is supplied to an amplifier 32, one output of which drives a speaker 34. The switch 36 operates a solenoid 38 and a switch 40 is provided for the main supply from the power pack. The power pack also serves as a source of power for operating a drive motor 42.

Particularly adapting the system for teaching, referring to FIG. 19, as schematically shown in that figure, the amplifier 44 incorporates the recording elements, and a very simple control system is provided in the form of three push-buttons 46, 48 and 50 associated with a controller 52 for selection of either the teacher's voice (connecting the first read element of the playback head to playback one of the pair of tracks) or connecting the second read element of the head for reading the other track of the track pair. In this arrangement, one push-button is provided for listening to the teacher's voice, one button for erasing and recording and a third button for listening to the fresh recording.

Still referring to FIG. 3, a single head may be utilized to take advantage of track pairs on the recording medium with the mechanism there illustrated. Thus the playback head will be shifted from track pair 24 to track pair 25 as successive transparencies are moved to display position, but the head 26 may also be shifted to an intermediate position to read or record and erase on the second track of the track pair. In this figure an optional channel or track is, in effect, provided for either playback or recording corresponding to each transparency. The movement is controlled by the operation of a button 56 which mechanically shifts the worm 10, sleeve 11 and playback head 26 linearly along the shaft 6 from one track to the other of a track pair (24 or 25). In this case the worm 10 may be splined on the shaft 6 to allow the requisite linear movement. To achieve that movement, a lever 58 pivotably supported about the pivot 60 is connected to the worm 10. The lever is normally biased by a spring 62 so that the playback head will normally read, for example, the first track of each track pair. Upon movement of the button 56 in the direction indicated by the arrow to bring the recess 64 adjacent the end 66 of the lever 58, it will be seen that by the action of the spring and by the pivoting motion of the lever, the head 26 can be caused to shift from one track to the other of a track pair.

Turning now to FIG. 4, the visual device diagrammatically illustrated operates with a transparency holder 3 in the form of a film in an endless loop with multiple transparencies being carried thereon. The drive for shifting the playback head 26 includes a worm having a slot 67 with a straight return portion 68 so that a return spring 70 acting on the playback head support returns the playback head to its initial position when the last transparency in a sequence on the holder 3 has been displayed and shifted from the display position.

Figure 5:
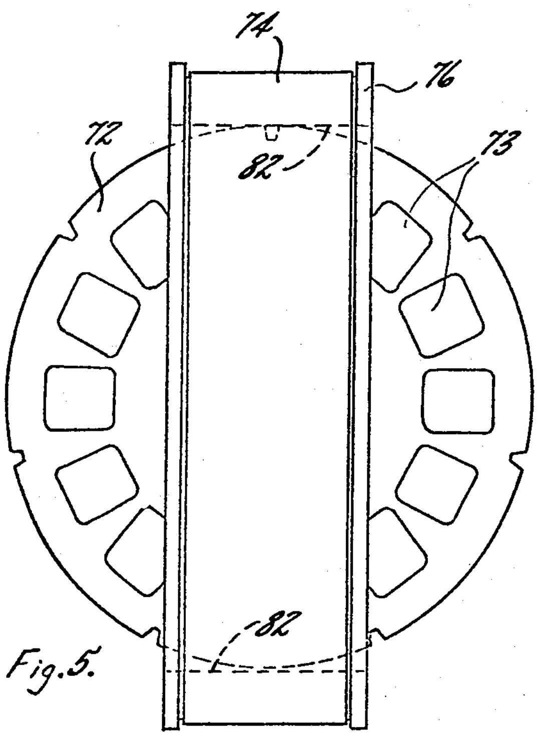
FIG. 5 is a plan view in diagrammatic form of an audio-visual device constructed in accordance with the invention and incorporating a circular holder for a series of transparencies and an endless belt recording medium but not illustrating the reproducing mechanism for playback of sound recordings on the recording medium which may take the forms illustrated in FIGS. 11–19.

While in the audio-visual device as illustrated in FIGS. 1–4, the transparency holder 3 is in the form of a film or film strip carrying multiple transparencies, there is shown in FIG. 5 a circular holder 72 for multiple transparencies 73 arranged around the outer edge or periphery of the holder.

FIG. 5 further illustrates an endless belt recording medium 74 carried in a cartridge 76 (see also FIG. 6) but does not illustrate the reproducing mechanism for playback of sound recordings on multiple tracks on the recording medium nor the drive for shifting the recording medium and playback elements in synchronism to insure synchronism of transparency display and playback of corresponding recordings, which mechanisms are shown for convenience in FIGS. 11–14. In this case, the recording medium 74 in the form of an endless belt is carried for slidable movement in a cartridge having at each end grooved curved guides 78, 80 and providing intermediate support surfaces 81 which also serve to space the guides 78, 80. The cartridge is formed with a longitudinal slot 82 adapted to receive the circular transparency holder, so that the circular holder is rotatable and retained upon such movement.

Figure 6:
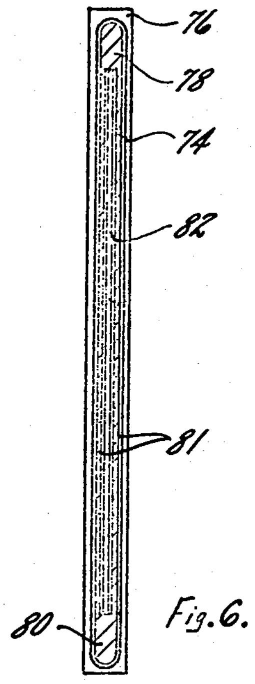
FIG. 6 is a side view of the audio-visual device of FIG. 5.
Figure 7:
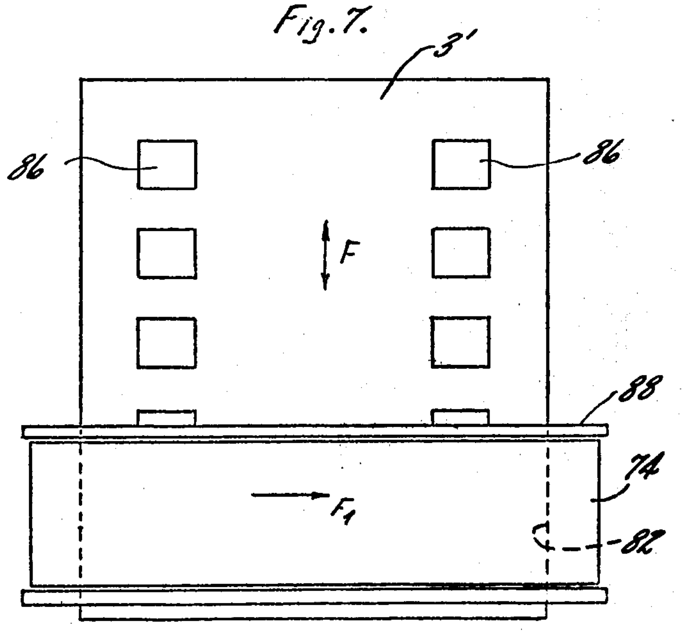
FIG. 7 is a plan view in diagrammatic form of an audio-visual device constructed in accordance with the invention and utilizing a rectangular transparency holder with a recording medium and support therefor similar to that shown in FIG. 5 and likewise not illustrating the reproducing mechanism for playback of recordings on the recording medium which may take the form of FIGS. 11–19.

Instead of a circular transparency holder, a rectangular holder 3′ for multiple transparencies may be utilized as shown in FIG. 7. In this case, the transparency holder 3′ carries multiple transparencies 86 in multiple rows. A cartridge 88 for an endless recording medium belt 74, constructed as illustrated in FIG. 6 is similarly provided with a central longitudinal slot 82 so that the transparency holder 3′ is slidable through the cartridge 88 for consecutive presentation of the transparencies 86 to a display position, while allowing the endless belt 74 to be driven continuously while each transparency is in a display position for playback of recordings on the belt.

Figure 8:
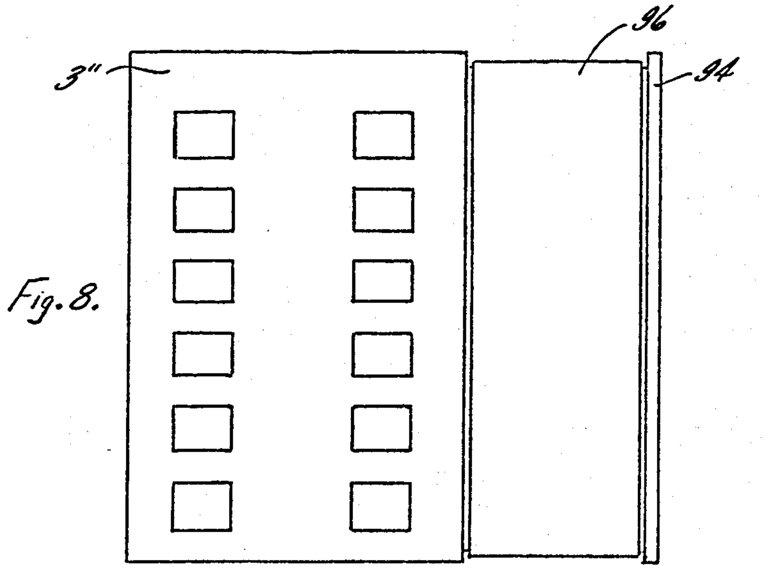
FIG. 8 is a plan view in diagrammatic form similar to FIG. 7 of an audio-visual device with a rectangular transparency holder.

Another form of rectangular transparency holder 3″ is shown in FIG. 8 again carrying multiple transparencies 92 in rows. In this case the cartridge 94 for the endless belt recording medium 96 is unitary with the transparency holder 3″ and, instead of moving the transparency holder, the projection or viewer device will be moved to consecutively display transparencies carried by the holder 3″.

Figure 9:
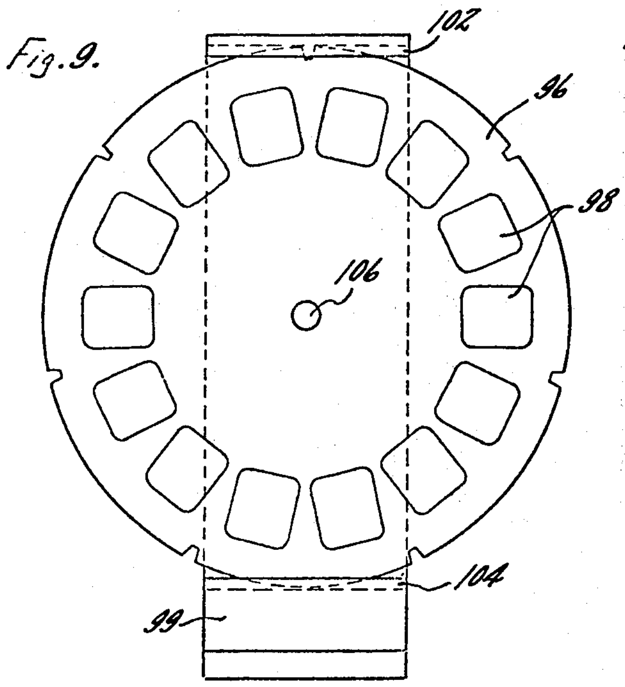
FIG. 9 is a plan view similar to FIG. 5, diagrammatic in form, of another embodiment of audio-visual device with a circular transparency holder and support for an endless belt recording medium.
Figure 10:
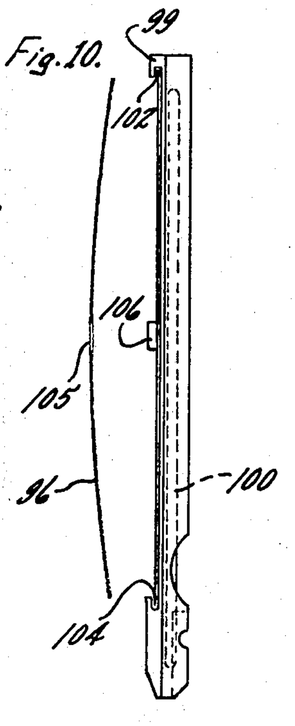
FIG. 10 is a side view of the audio-visual device shown in FIG. 9.

Another form of audio-visual device similar to that shown in FIG. 5 is illustrated in FIG. 9; in this case, the circular transparency holder 96 with multiple transparencies 98 is carried exposed on the face of a cartridge 99 for an endless belt recording medium belt 100 such as a magnetic tape. The cartridge 99 is provided with retaining recesses 102, 104 for the circular transparency holder 96 which can be bent as shown in FIG. 10 so that it can be introduced into these retaining recesses. A central aperture 105 in the transparency holder 96 fits on a projection 106 on the support so that the transparency holder is rotatable. Internally within the cartridge 99, guides and tracks are divided for continuous slidable movement of an endless recording medium belt 100 such as magnetic tape.

Thus, in FIGS. 5–9 various forms of audio-visual devices are illustrated utilizing transparency holders for multiple transparencies and associated cartridge recording support means for an endless recording medium. Now turning to FIGS. 11–14, these figures show a mechanism for consecutively moving transparencies on a circular transparency holder 110 similar to that shown in FIGS. 5 and 9, into display position while simultaneously shifting a playback head from one recording track to another on an endless belt recording medium 112 similar to that shown in FIGS. 5 and 9. FIG. 11 also illustrates a drive for continuously moving an endless recording belt 112 while a single transparency is being displayed. Referring to FIG. 11, the mechanism elements for moving the transparency holder 110 are shown as a lever 113 with a pawl 114 which engages in recesses 115 in the edge of the transparency holder 110. The recesses 115 are spaced so that by operation of the lever 113 manually two transparencies may be successively moved to display position and then upon release of the pawl 114 the operating lever 113 will return to its start position in which it is illustrated in FIG. 11 ready to be moved again to move the next two transparencies consecutively to display position. The lever 113 pivotable around a pivot pin 116 is also operable to move a sliding rod or bar 118 which is connected to the movable playback head 119 to shift it to successive recording tracks. For this purpose the lever 112 has a projection 120 at one end which engages a lug 121 on the bar 118 to move it longitudinally. The bar 118 is guided in its longitudinal and reciprocal movement by means of slots 122 in the bar and a pin 124 which rides in the slot 122. The bar 118 has a series of teeth 125 which cooperate with a leaf spring 126 carried by a support 128 for the playback head 119. It will be seen that the leaf spring 126 and the teeth 125 provide a ratchet mechanism so that upon the lever 113 shifting the bar 118 to the right, as the holder is moved to move the next transparency into display position, the support 128 for the playback head and the playback head 119 itself will be shifted to the right to the next adjacent recording track. The teeth 125 and leaf spring 126 operate as a ratchet mechanism in that the bar 118 is returnable by a return spring 130 the distance defined by the slot 122 so that the bar 118 reciprocates in the operation of the device, is moved to the right as the operating lever 113 moves in the direction of the arrow FZ to shift the transparency holder in steps the space of two transparencies, and then the bar 118 may return to the left as the operating lever is similarly shifted back to its initial position as shown in FIG. 11 to the initial or starting position of the bar 118 which is also illustrated in FIG. 11. To locate the playback head 119 precisely in position over each recording track after it has been moved, a second leaf spring 132 is provided on the playback head support 128 which bears on teeth 134, the leaf spring 132 and teeth 134 providing a detent mechanism for fixing the successive positions to the playback head.

The playback head support 128 is carried by a pair of parallel rods 140 which are supported in the apparatus by cross members 142. A spring 144 provides a resilient means to return the playback head support to its starting position as shown in FIG. 11 after the completion of a cycle of display of all the transparencies on the holder 110.

To provide for continuous operation of the endless belt recording medium 112, referring to FIG. 14, a capstan 150 is driven by an operating motor 152. The capstan 150 is carried on a spindle 154 driven by a pulley 156 around which a drive belt 158 is trained. The drive belt 158 is operated from the motor 152 via pulleys and a belt as shown in FIGS. 11 and 12. The drive belt 158 is adapted to be tensioned so as to cause the recording medium to be continuously operated while a transparency is being displayed, by means of a tensioning roller 160. The roller 160 is borne by lever 161 which is pivotable around a pivot 162 (see FIG. 12). In pivoting, the lever 161 bears by way of a leaf spring 164 on an inclined surface 166 of the bar 118. Consequently, as the bar 118 slides, it pivots the lever 161 so as to tension the drive belt 158 for the recording medium.

Figure 15:
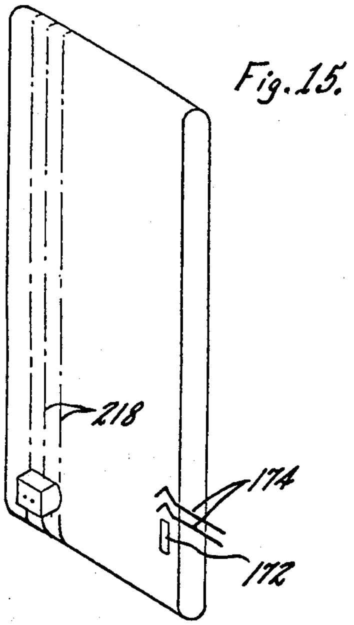
FIG. 15 is a diagrammatic view of a recording medium belt of the type which may be used in the devices of FIGS. 5 and 9 and illustrating the provision of separate recording tracks.

As shown in FIG. 12, a pawl 168 serves to retain the lever 161; at the end of a recording the lever 161 will be released by the operation of a solenoid 170 actuated, illustratively, by a metal marker 172 or the like (FIG. 15) on the recording belt or other signal producing means for indicating that the belt has travelled a full revolution to carry the full length of a recording track past the playback head. As shown in FIG. 15, a metal marker 172 on the tape may short circuit the contacts 174 of a switch as the marker passes by, and the signal generated will operate the solenoid 170 to lift the pawl 168, releasing the lever 161 so that the return spring 176 acts on the lever to slacken the belt 158 and effectively disconnect the drive for the endless belt recording medium. To playback the recording track for the next transparency being displayed, the pawl 168 is reset so as to tension the drive belt 158 for the recording medium to cause it to be operated.

Now turning to FIG. 14, the invention further provides a mechanism for automatically starting the reproducing system for recordings on the recording medium responsive to the insertion of a cartridge into the device. The cartridge 180 carrying a transparency holder illustratively of the form shown in FIG. 5, when introduced into the device acts on a lever 190 to pivot it about its support 192. Pivotal motion of the lever is effective to shift a playback head 194 into operating position adjacent the endless recording medium belt such as an endless magnetic tape 196. Pivotal motion of the lever 190 is also operable to act on the leaf springs 126, 132 to release them for engagement with the teeth 125, 134, respectively, to place the mechanism in operating condition. When the cartridge 180 is withdrawn from the device, the lever 190 is returned by a spring 200 to withdraw the playback head 194 from interference with the recording belt. Furthermore, the lever 190 is operable to lift the leaf springs 126, 132 from engagement with their associated teeth 125, 134, to release the bar 118 so that under the action of the return springs 130 and 144, the bar and playback head are returned to a starting position ready for recording or playback of recordings on the first track of the multiple tracks on the recording medium. The lever 190 may also operate a main switch 202. It will also be appreciated that the clutch mechanism or drive belt tensioning device including the drive belt 158 and the roller 160 may be arranged for manual operation so that the playback head may be shifted to repeat a recording without changing over to a subsequent transparency and subsequent recording.

Figures 16, 17:
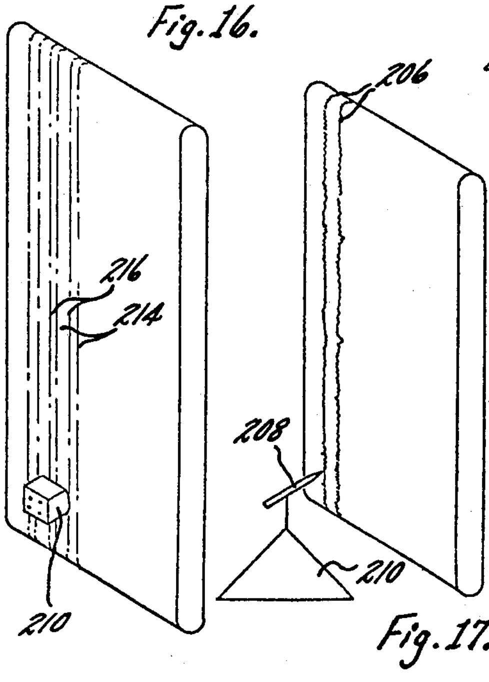
FIG. 16 is a view similar to FIG. 15 illustrating diagrammatically the provision of multiple pairs of recording tracks on an endless magnetic tape.
FIG. 17 is a view illustrating diagrammatically that the recording medium may take the form of an endless belt having cut grooves readable by a phonograph needle and arranged in separate tracks on the endless belt.

While heretofore the recording medium in the form of an endless belt has been described as a magnetic tape, it will be appreciated that the recordings may take the form of cut grooves 206 and a needle 208 provided for reproduction recordings via a conventional phonograph needle type reproducing mechanism 210, as illustrated in FIG. 17.

As shown in FIG. 16, a double recording head 210 may be provided which is arranged to step a distance corresponding to the distance between pairs of tracks 214, 216. Multiple single recording tracks 218 are illustrated in FIG. 15.

I claim as my invention:

1. An audio-visual device for displaying transparencies in synchronism with reproduction from a record medium of corresponding sound recordings, said transparencies being arranged in a series on a film strip, and said record medium comprising an independent endless belt, said device comprising, in combination: a cartridge having a support for said film strip and a support for said endless belt, said film strip and endless belt being supported with their longitudinal axes parallel, said cartridge having a window and said film strip being movable on its support to position any one of said transparencies in said window for display, said endless belt being continuously movable on its support for reproducing sound recordings made along separate recording tracks parallel to the axis of said belt and corresponding, respectively, to said transparencies; means for reproducing said sound recordings including a movably mounted playback head shiftable into a playing position over each of said recording tracks; and a mechanism for synchronously positioning both said film strip and said playback head, comprising a rotatable shaft operating interconnected drive means for said film strip and playback head, said film strip drive means including a toothed wheel cooperating with perforations in the film strip, so that as said film strip is moved to position any one of said transparencies in display position in said window, in synchronism said playback head is shifted into playing position over one of said recording tracks to reproduce a recording corresponding to the particular transparency being displayed upon relative movement of said endless belt.

2. An audio-visual device according to claim 1, in which said film strip is in the form of an endless loop.

3. An audio-visual device according to claim 1, in which said drive means for shifting said playback head includes a worm gear cooperating with means connected to the head to shift the head between recording tracks.

4. An audio-visual device for displaying transparencies in synchronism with reproduction from a record medium of corresponding sound recordings, said transparencies being arranged in a series on a film strip, and said record medium comprising an independent endless belt, said device comprising, in combination: a cartridge having a support for said film strip and a support for said endless belt, said film strip and endless belt being supported with their longitudinal axes parallel, said film strip being movable on its support to position any one of said transparencies for display, said endless belt being continuously movable on its support for reproducing sound recordings made along separate recording tracks parallel to the axis of said belt and corresponding, respectively, to said transparencies; means for reproducing said sound recordings including a movably mounted playback head shiftable into a playing position over each of said recording tracks; and a mechanism for synchronously positioning both said film strip and said playback head, comprising interconnected drive means for said film strip and playback head, said film strip drive means including a toothed wheel cooperating with perforations in the film strip, so that as said film strip is moved to position any one of said transparencies in display position, in synchronism said playback head is shifted into playing position over one of said recording tracks to reproduce a recording corresponding to the particular transparency being displayed upon relative movement of said endless belt.

5. An audio-visual device according to claim 4 in which a pair of recording tracks are provided on the record medium corresponding to each transparency, and means are provided for shifting the playback head to the pair of recording tracks corresponding to the particular transparency being displayed.

6. An audio visual device according to claim 4 in which said record medium has parallel, separate pairs of recording tracks, each pair of tracks corresponding to one of said transparencies and said drive means for said playback head includes means for selectively shifting said playback head from track to track of each said pair without moving said film strip for playback of recordings selectively from either track while the corresponding transparency is displayed.

7. An audio visual device according to claim 6 further including means for recording sound on said recording tracks.

8. An audio-visual device according to claim 4 in which the playback head is a double-head for selective playback and recording of at least one of each pair of tracks.

9. An audio-visual device according to claim 4 in which the playback head is a single head, and means are provided for shifting the playback head to an intermediate position over one of the tracks of each pair, as well as between the pairs of tracks.

10. An audio visual device for displaying transparencies in synchronism with reproduction from a record medium of corresponding sound recordings, said transparencies being in the form of multiple transparencies carried by a holder and said record medium comprising an independent endless belt, said device comprising, in combination:

a cartridge having a support for said holder and a support for said endless belt, said transparency holder being movable on its support to position any one of said transparencies for display, said endless belt being continuously movable on its support for reproducing sound recordings made on said belt along separate recording tracks parallel to the axis of said belt and corresponding, respectively, to said transparencies;

means for reproducing said sound recordings including a movably mounted playback head shiftable into a playing position over each of said recording tracks;

and a mechanism for synchronously positioning both said holder and said playback head comprising interconnected drive means for said holder and playback head, comprising a slidable bar having a series of teeth, said playback head being carried by a support having a ratchet connection with said teeth, so that movement of said bar in one direction upon movement of said transparency holder to move a transparency into display position, in synchronism shifts said playback head via its support into playing position over the next recording track and said bar upon return leaves the playback head over said recording track.

11. An audio-visual device for displaying transparencies in synchronism with reproduction from a record medium of corresponding sound recordings, said transparencies being in the form of multiple transparencies carried by a holder and said record medium comprising an independent endless belt, said device comprising, in combination:

a cartridge having a support for said holder and a support for said endless belt, said transparency holder being movable on its support to position any one of said transparencies for display, said endless belt being continuously movable on its support for reproducing sound recordings made on said belt along separate recording tracks parallel to the axis of said belt and corresponding, respectively, to said transparencies;

means for reproducing said sound recordings including a movably mounted playback head shiftable into a playing position over each of said recording tracks;

and a mechanism for synchronously positioning both said holder and said playback head comprising interconnected drive means for said holder and playback head, so that as said holder is moved by said mechanism to position any one of said transparencies in display position, in synchronism said playback head is moved into playing position over one of said recording tracks to reproduce a recording thereon corresponding to the particular transparency being displayed upon relative movement of said endless belt.

12. An audio-visual device according to claim 11, in which said transparency holder is circular and multiple transparencies are disposed around the periphery of said circular holder.

13. An audio-visual device according to claim 11, in which said transparency holder is rectangular and multiple transparencies are arrayed in parallel rows on said holder.

* * * * *